(12) United States Patent
Sun et al.

(10) Patent No.: US 11,984,840 B2
(45) Date of Patent: May 14, 2024

(54) ROPE TRANSMISSION STRUCTURE, SOLAR ENERGY TRACKER AND APPLICATION METHOD THEREOF

(71) Applicant: Jiangsu ENeutral New Energy Technology Co., Ltd., Jiangsu (CN)

(72) Inventors: Haitao Sun, Shandong (CN); Yanglin Li, Shandong (CN); Zhongjun Yang, Shandong (CN); Hepeng Wang, Shandong (CN); Jianguo Yan, Shandong (CN)

(73) Assignee: JIANGSU ENEUTRAL NEW ENERGY TECHNOLOGY CO., LTD., Jiangsu (CN)

(*) Notice: Subject to any disclaimer, the term of this patent is extended or adjusted under 35 U.S.C. 154(b) by 616 days.

(21) Appl. No.: 17/286,757

(22) PCT Filed: Jul. 26, 2019

(86) PCT No.: PCT/CN2019/097849
§ 371 (c)(1),
(2) Date: Apr. 19, 2021

(87) PCT Pub. No.: WO2020/178061
PCT Pub. Date: Apr. 23, 2020

(65) Prior Publication Data
US 2021/0336579 A1    Oct. 28, 2021

(30) Foreign Application Priority Data
Oct. 19, 2018  (CN) .......................... 201811220221.4

(51) Int. Cl.
*F24S 30/42* (2018.01)
*H02S 20/32* (2014.01)
*F24S 30/00* (2018.01)

(52) U.S. Cl.
CPC .............. *H02S 20/32* (2014.12); *F24S 30/42* (2018.05); *F24S 2030/11* (2018.05);
(Continued)

(58) Field of Classification Search
CPC ...... F24S 30/42; F24S 30/425; F24S 2030/11; F24S 2030/16; F24S 2030/133; F24S 2030/136; H02S 20/32
See application file for complete search history.

(56) References Cited

U.S. PATENT DOCUMENTS 4,559,926 A * 12/1985 Butler .................... F24S 23/74
126/694
6,302,099 B1    10/2001 McDermott
(Continued)

FOREIGN PATENT DOCUMENTS

CN    204089702 U    1/2015
CN    104953937 A    9/2015
(Continued)

*Primary Examiner* — Alfred Basichas
(74) *Attorney, Agent, or Firm* — IP & T GROUP LLP

(57) ABSTRACT

Disclosed are a rope transmission structure, a solar energy tracker and the application method thereof, relating to the technical field of solar power generation. The rope transmission structure includes a driving wheel, a driven wheel, a main transmission rope and a plurality of tracking units. The main transmission rope is connected end to end, and one end of the main transmission rope is sleeved on the driving wheel and the other end thereof is sleeved on the driven wheel. The plurality of tracking units are provided at intervals along a lengthwise direction of the main transmission rope. A rotating member is hinged on a mounting bracket, and one end of a first branch rope is connected to the rotating member and the other end thereof is connected to the main transmission rope.

20 Claims, 6 Drawing Sheets

(52) U.S. Cl.
CPC .... *F24S 2030/133* (2018.05); *F24S 2030/136* (2018.05); *F24S 2030/16* (2018.05)

(56) References Cited

U.S. PATENT DOCUMENTS

| | | | | |
|---|---|---|---|---|
| 9,175,877 | B1* | 11/2015 | Olsen | F24S 30/455 |
| 2007/0023080 | A1* | 2/2007 | Thurner | F24S 30/422 |
| | | | | 136/246 |
| 2011/0208326 | A1* | 8/2011 | Dror | F24S 30/48 |
| | | | | 700/71 |
| 2013/0276862 | A1* | 10/2013 | Luo | H02S 20/10 |
| | | | | 136/246 |
| 2015/0377520 | A1* | 12/2015 | Kufner | F24S 30/425 |
| | | | | 126/605 |
| 2018/0254739 | A1* | 9/2018 | Luo | F24S 30/48 |

FOREIGN PATENT DOCUMENTS

| | | | |
|---|---|---|---|
| CN | 106208945 | A | 12/2016 |
| CN | 207442782 | U | 6/2018 |
| CN | 109164835 | A | 1/2019 |
| CN | 208922126 | U | 5/2019 |

* cited by examiner

ROPE TRANSMISSION STRUCTURE, SOLAR ENERGY TRACKER AND APPLICATION METHOD THEREOF

CROSS-REFERENCE TO RELATED APPLICATION

This application is a national stage application of PCT/CN2019/097849 filed on Jul. 26, 2019, which claims the priority to the Chinese patent application with the filing No. 201811220221.4, filed on Oct. 19, 2018 with the Chinese Patent Office, and entitled "Rope Transmission Structure and Solar Energy Tracker", the contents of which are incorporated herein by reference in entirety.

TECHNICAL FIELD

The present disclosure relates to the technical field of solar power generation, and in particular, to a rope transmission structure, a solar energy tracker, and an application method thereof.

BACKGROUND ART

The solar energy tracking system is a mechanical and electronic control unit system that can automatically rotate with the movement of the sun in the process of photothermal and photovoltaic power generation, so that rays of the sunlight can be sufficiently irradiated on a solar cell panel at any time, thus improving the photoelectric conversion efficiency, and increasing the overall power generation amount.

The current solar energy tracking systems have a higher construction cost.

SUMMARY

Objectives of the present disclosure include providing a rope transmission structure, which is simple in structure, can simultaneously drive a plurality of photovoltaic assembly arrays to rotate, and has a low cost, and strong practicability.

Another objective of the present disclosure includes providing a solar energy tracker, which has a simple structure, is ultra-long, and can simultaneously drive a plurality of photovoltaic assembly arrays to rotate, thus reducing the construction cost and the cleaning cost, and having strong practicability and high cost performance.

The present disclosure may be realized by adopting the following technical solution.

A rope transmission structure, including a driving wheel, a driven wheel, a main transmission rope, and a plurality of tracking units (which may also be called as track units), wherein the main transmission rope is connected end to end, one end of the main transmission rope is sleeved on the driving wheel, and the other end thereof is sleeved on the driven wheel, the driving wheel is capable of driving the driven wheel to rotate through the main transmission rope, the plurality of tracking units are provided at intervals along a length direction of the main transmission rope, the tracking unit includes a mounting bracket, a rotating member, and a first branch rope, the rotating member is hinged on the mounting bracket, a plane where a rotation direction of the rotating member is located is perpendicular to a plane where a rotation direction of the driving wheel is located, the first branch rope has one end connected to the rotating member, and the other end connected to the main transmission rope, and the first branch rope is capable of driving the rotating member to rotate when the driving wheel rotates.

Optionally, the rotating member includes an arc-shaped strip and a mounting strip, the arc-shaped strip is provided with a first end portion and a second end portion opposite to each other, the first end portion and the second end portion are both fixedly connected to the mounting strip, the mounting strip is hinged to the mounting bracket, and the first branch rope is fitted to a side of the arc-shaped strip facing away from the mounting strip, and one end of the first branch rope is connected to the first end portion.

Optionally, the main transmission rope is provided at a bottom portion of the arc-shaped strip, and the main transmission rope is located on a plane where the rotation direction of the rotating member is located.

Optionally, the tracking unit further includes a second branch rope, the second branch rope is fitted to a side of the arc-shaped strip facing away from the mounting strip, and the second branch rope is provided intersected with the first branch rope, the second branch rope has one end connected to the main transmission rope, and the other end connected to the second end portion; the main transmission rope includes two half rings, wherein one half ring is located on one side of the connecting line between the driving wheel and the driven wheel, the other half ring is located on the other side of the connecting line between the driving wheel and the driven wheel; a connecting part between the first branch rope and the main transmission rope and a connecting part between the second branch rope and the main transmission rope are located on the same half ring, and this half ring is coplanar with the plane where the rotation direction of the rotating member is located.

Optionally, the mounting bracket includes a hinge frame body, a fixing arm, and a fixing post, there are two fixing arms, the two fixing arms are both connected between the fixing post and the hinge frame body, and the two fixing arms are provided opposite to each other on two sides of the hinge frame body, the hinge frame body, the fixing post, and the two fixing arms form a limiting hole, the mounting strip is hinged with the hinge frame body, and the arc-shaped strip passes through the limiting hole.

Optionally, the hinge frame body includes a connecting arm and two hinge arms, the two hinge arms are both fixedly connected to the connecting arm and provided at the two sides of the connecting arm opposite to each other; and the mounting strip is provided between the two hinge arms, and is hinged with the two hinge arms by a hinge member.

Optionally, the tracking unit further includes a first fixed pulley, the first fixed pulley is mounted on the mounting bracket, a length direction of the main transmission rope is perpendicular to the plane where the rotation direction of the rotating member is located, and the first branch rope winds the first fixed pulley and is connected to the main transmission rope.

Optionally, the tracking unit further includes a second fixed pulley and a third branch rope, the second fixed pulley is mounted to the mounting bracket, and is provided opposite to the first fixed pulley, the third branch rope is fitted to a side of the arc-shaped strip facing away from the mounting strip, and provided intersected with the first branch rope, one end of the third branch rope is connected to the second end portion, and the other end winds the second fixed pulley and is connected to the main transmission rope.

Optionally, a fixing frame is mounted on the mounting bracket, a length direction of the fixing frame is perpendicular to the length direction of the main transmission rope, and one end of the fixing frame facing away from the first end portion is pivotally connected to the first pulley to form the first fixed pulley; and one end of the fixing frame facing away from the second end portion is pivotally connected to a second pulley to form the second fixed pulley.

Optionally, a guide block is further provided at two ends of the fixing frame, each of the guide blocks is provided with a guide hole, and the main transmission rope is slidably penetrated through the guide hole.

Optionally, a first limiting groove and a second limiting groove is provided on the arc-shaped strip, a portion of the first branch rope fitted to the arc-shaped strip is embedded in the first limiting groove, and a portion of the third branch rope fitted to the arc-shaped strip is embedded in the second limiting groove.

Optionally, the first limiting groove and the second limiting groove both extend along the length direction of the arc-shaped strip, and the first limiting groove and the second limiting groove are provided at intervals.

Optionally, the first fixed pulley and the second fixed pulley are both provided in a closed area formed by the main transmission rope, and a plane where a rotation direction of the first fixed pulley is located, a plane where a rotation direction of the second fixed pulley is located, and the plane where the rotation direction of the driving wheel is located are all the same plane.

Optionally, the main transmission rope is fixedly connected to the driving wheel.

Another objective of the present disclosure includes providing an application method, configured to use the above rope transmission structure, wherein operation steps include:
 fixing the driving wheel, the driven wheel, and the mounting bracket, wherein parts of the first branch rope and the second branch rope fitted to the arc-shaped strip jointly cover the whole arc-shaped strip; and
 controlling the driving wheel to rotate, wherein the driving wheel drives the main transmission rope to achieve transmission, when the driving wheel is in a first driving direction, the main transmission rope pulls the first branch rope to rotate synchronously therewith, the first branch rope pulls the arc-shaped strip to rotate around a hinge between the mounting strip and the mounting bracket, length of the first branch rope fitted to the arc-shaped strip decreases, and meanwhile, length of the second branch rope fitted to the arc-shaped strip increases;
 alternatively, when the driving wheel is in a second driving direction, the main transmission rope pulls the second branch rope to rotate synchronously therewith, the second branch rope pulls the arc-shaped strip to rotate around a hinge between the mounting strip and the mounting bracket, length of the second branch rope fitted to the arc-shaped strip decreases, and meanwhile, length of the first branch rope fitted to the arc-shaped strip increases.

A further objective of the present disclosure includes providing an application method, configured to use the above rope transmission structure, and operation steps include:
 fixing the driving wheel, the driven wheel, and the mounting bracket, wherein parts of the first branch rope and the third branch rope fitted to the arc-shaped strip jointly cover the whole arc-shaped strip; and
 controlling the driving wheel to rotate, wherein the driving wheel drives the main transmission rope to achieve transmission, when the driving wheel is in a first driving direction, the main transmission rope pulls the first branch rope to rotate synchronously therewith, the first branch rope pulls the arc-shaped strip to rotate around a hinge between the mounting strip and the mounting bracket, length of the first branch rope fitted to the arc-shaped strip decreases, and meanwhile, length of the third branch rope fitted to the arc-shaped strip increases;
 alternatively, when the driving wheel is in a second driving direction, the main transmission rope pulls the third branch rope to rotate synchronously therewith, the third branch rope pulls the arc-shaped strip to rotate around a hinge between the mounting strip and the mounting bracket, length of the third branch rope fitted to the arc-shaped strip decreases, and meanwhile, length of the first branch rope fitted to the arc-shaped strip increases.

The present disclosure further provides a solar energy tracker, including a rope transmission structure and a plurality of photovoltaic assembly arrays, wherein the rope transmission structure includes a driving wheel, a driven wheel, a main transmission rope, and a plurality of tracking units, the main transmission rope is connected end to end, one end of the main transmission rope is sleeved on the driving wheel, and the other end thereof is sleeved on the driven wheel, the driving wheel is capable of driving the driven wheel to rotate through the main transmission rope, the plurality of tracking units are provided at intervals along a length direction of the main transmission rope, the tracking unit includes a mounting bracket, a rotating member, and a first branch rope, each of the photovoltaic assembly arrays is mounted on at least one of the rotating members, the rotating member is hinged on the mounting bracket, a plane where a rotation direction of the rotating member is located is perpendicular to a plane where a rotation direction of the driving wheel is located, the first branch rope has one end connected to the rotating member, and the other end connected to the main transmission rope, and the first branch rope is capable of driving the rotating member to rotate when the driving wheel rotates.

Optionally, each of the photovoltaic assembly arrays is mounted on two of the rotating members.

Optionally, there are a plurality of rope transmission structures, the plurality of rope transmission structures extend along a length direction of one main transmission rope therein, and the photovoltaic assembly arrays mounted on two adjacent rope transmission structures are continuously provided.

The rope transmission structure and the solar energy tracker provided in the present disclosure at least include the following beneficial effects:

For the rope transmission structure provided in the present disclosure, the main transmission rope is connected end to end, one end of the main transmission rope is sleeved on the driving wheel, and the other end thereof is sleeved on the driven wheel, the driving wheel is capable of driving the driven wheel to rotate through the main transmission rope, the plurality of tracking units are provided at intervals along a length direction of the main transmission rope, the tracking unit includes a mounting bracket, a rotating member, and a first branch rope, the rotating member is hinged on the mounting bracket, a plane where a rotation direction of the rotating member is located is perpendicular to a plane where a rotation direction of the driving wheel is located, the first branch rope has one end connected to the rotating member, and the other end connected to the main transmission rope, and the first branch rope is capable of driving the rotating member to rotate when the driving wheel rotates. Compared with the prior art, as the rope transmission structure provided in the present disclosure adopts the main transmission rope sleeved outside the driving wheel and the driven wheel and the first branch rope connected between the main transmission rope and the rotating member, the length from the driving wheel to the driven wheel is ultra-long, then a plurality of rotating members can be simultaneously driven to rotate, thus reducing the construction cost and the cleaning cost, and having strong practicability.

The solar energy tracker provided in the present disclosure, including the rope transmission structure, has a simple structure, and ultra-long length from the driving wheel to the driven wheel, and can simultaneously drive a plurality of rotating members to rotate, thus reducing the construction cost and the cleaning cost, and having strong practicability, and high cost performance.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation on the scope, and those ordinarily skilled in the art still could obtain other relevant accompanying drawings according to these accompanying drawings, without using any creative efforts.

Figure 5:
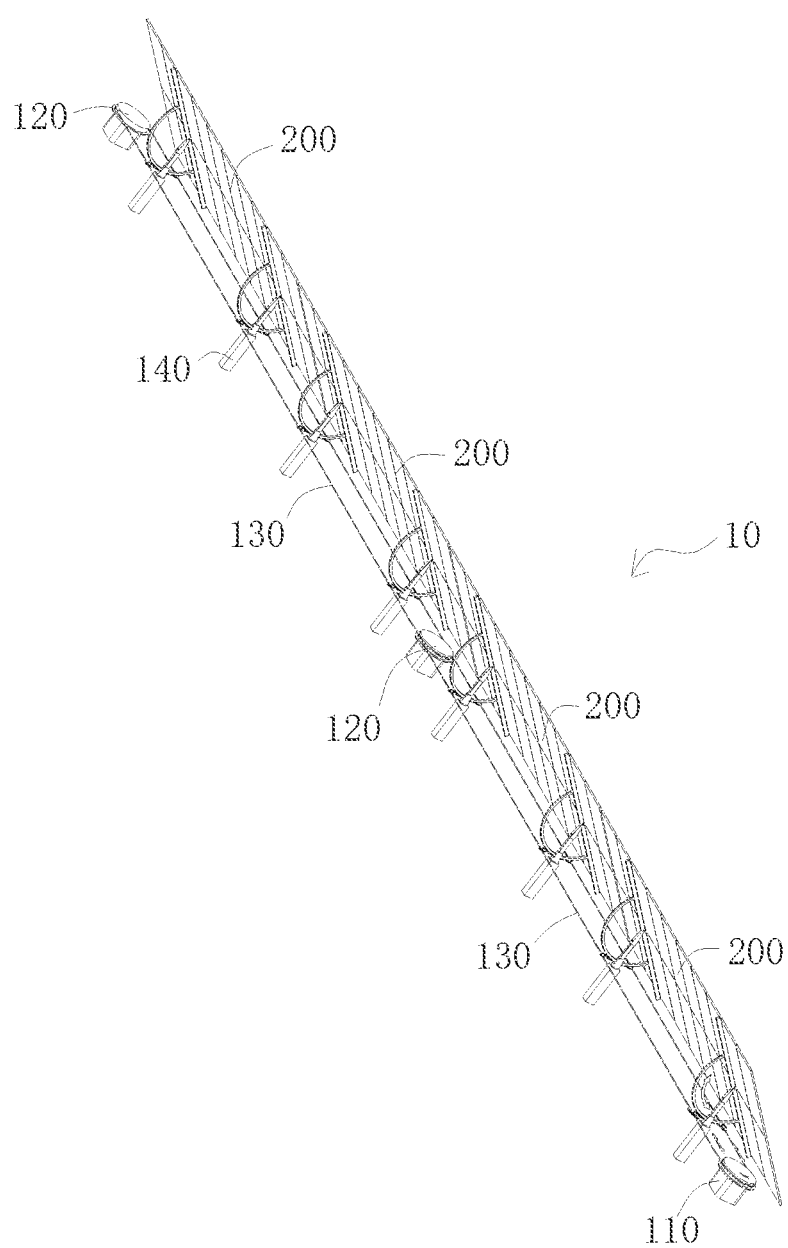
FIG. 5 is a second structural schematic view of the solar energy tracker provided in the present disclosure.
Figure 9:
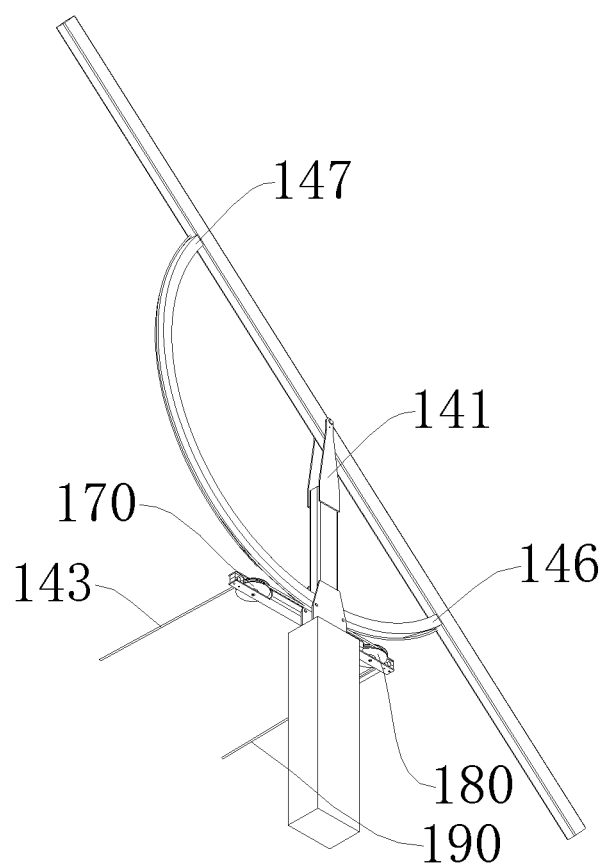

a structural schematic view of the rope transmission structure provided in the present disclosure;

FIG. 9 is a structural schematic view of the tracking unit in FIG. 5; and

Figure 10:
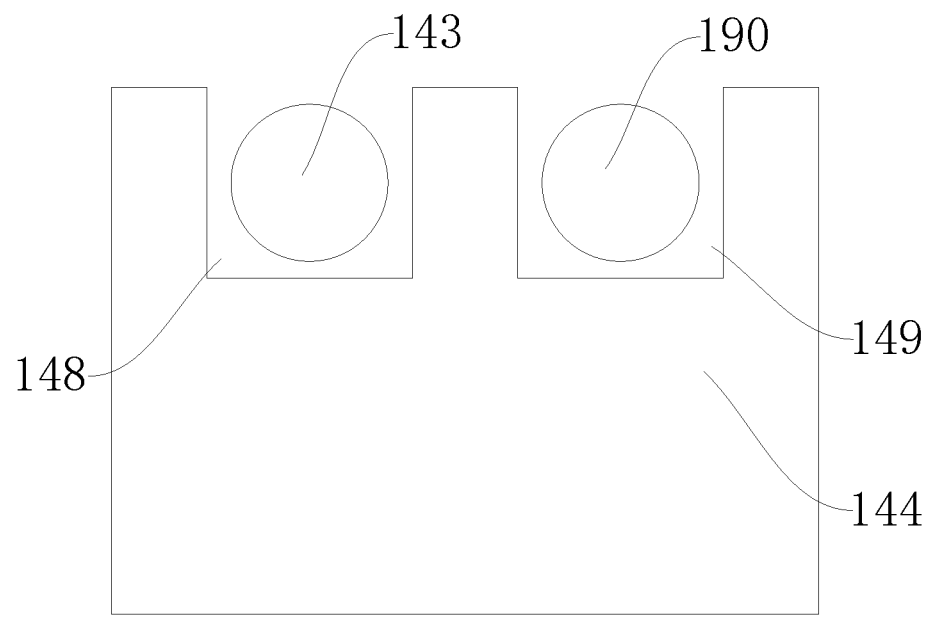

FIG. 10 is a structural schematic view of cooperation between the first branch rope and the third branch rope and the first limiting groove and the second limiting groove on the arc-shaped strip in FIG. 9.

REFERENCE SIGNS

10—solar energy tracker; 100—rope transmission structure; 110—driving wheel; 120—driven wheel; 130—main transmission rope; 140—tracking unit; 141—mounting bracket; 142—rotating member; 143—first branch rope; 144—arc-shaped strip; 145—mounting strip; 146—first end portion; 147—second end portion; 148—first limiting groove; 149—second limiting groove; 151—fixing post; 152—fixing arm; 153—limiting hole; 154—connecting arm; 155—hinge arm; 156—hinge member; 160—second branch rope; 170—first fixed pulley; 171—fixing frame; 172—guide block; 173—guide hole; 174—first pulley; 180—second fixed pulley; 181—second pulley; 190—third branch rope; 200—photovoltaic assembly array.

DETAILED DESCRIPTION OF EMBODIMENTS

In order to make objectives, technical solutions, and advantages of the embodiments of the present disclosure clearer, the technical solutions in the embodiments of the present disclosure will be described clearly and completely below in conjunction with accompanying drawings in the embodiments of the present disclosure, and apparently, some but not all embodiments of the present disclosure are described. Generally, components in the embodiments of the present disclosure, as described and shown in the accompanying drawings herein, may be arranged and designed in various different configurations.

Therefore, the detailed description below of the embodiments of the present disclosure provided in the accompanying drawings is not intended to limit the scope of the present disclosure claimed, but merely illustrates chosen embodiments of the present disclosure. All of other embodiments obtained by those ordinarily skilled in the art based on the embodiments of the present disclosure without using any creative efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be indicated that orientation or positional relationships indicated by terms such as "inner", "outer", "upper", "lower", "horizontal", and "vertical" are based on orientation or positional relationships as shown in the drawings, or orientation or positional relationships of a product of the present disclosure when being conventionally placed in use, merely for facilitating describing the present disclosure and simplifying the description, rather than indicating or suggesting that related devices or elements have to be in the specific orientation or configured and operated in a specific orientation, therefore, they should not be construed as limiting the present disclosure. Besides, terms such as "first", "second", and "third" are merely for distinctive description, but should not be construed as indicating or implying importance in the relativity.

In the description of the present disclosure, it should be further illustrated that, unless otherwise specifically regulated and defined, the terms "set", "join", "mount", and "connect" should be understood in a broad sense, for example, it may be fixed connection, detachable connection, or integrated connection; it may be mechanical connection or electrical connection; it may be direct joining or indirect joining through an intermediary, and it also may be inner communication between two elements. For those ordinarily skilled in the art, specific meanings of the above-mentioned terms in the present disclosure could be understood according to specific circumstances.

Some embodiments of the present disclosure are described in detail below in combination with the drawings. The features in the following embodiments may be combined with each other without conflict.

Figure 1:
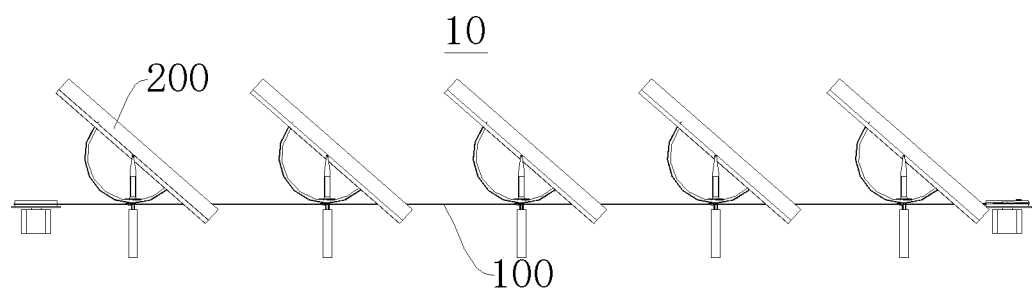
FIG. 1 is a first structural schematic view of a solar energy tracker provided in the present disclosure.

Referring to FIG. 1, an embodiment of the present disclosure provides a solar energy tracker 10 for tracking the sun motion in real time and performing photovoltaic power generation. The solar energy tracker has a simple structure, is ultra-long, and can simultaneously drive a plurality of photovoltaic assembly arrays to rotate, thus reducing the construction cost and the cleaning cost, and having strong practicability and high cost performance. The solar energy tracker 10 includes a rope transmission structure 100 and a plurality of photovoltaic assembly arrays 200. The plurality of photovoltaic assembly arrays 200 are all mounted on the rope transmission structure 100, the rope transmission structure 100 simultaneously drives the plurality of photovoltaic assembly arrays 200 to rotate with the sun, and the photovoltaic assembly arrays 200 are configured to absorb solar energy and generate power. In the present embodiment, the rope transmission structure 100 is ultra-long, and the number of photovoltaic assembly arrays 200 mounted on the rope transmission structure 100 is also large, which not only can improve the power generation efficiency, but also can reduce the construction cost and the cleaning cost, thus having high cost performance.

Figure 2:
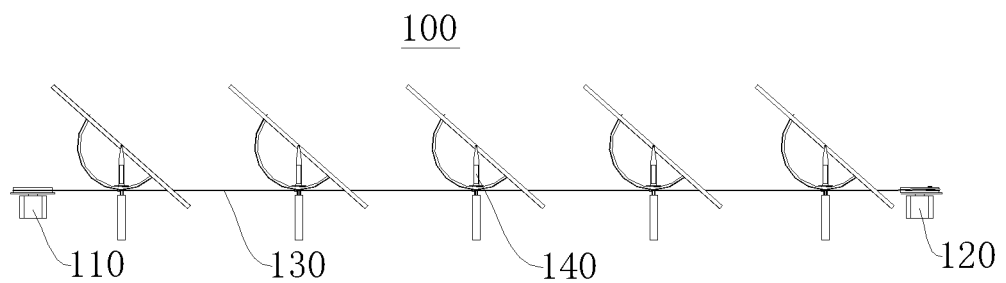
FIG. 2 is a structural schematic view of a rope transmission structure in FIG. 1.

Specifically, referring to FIG. 2, the rope transmission structure 100 includes a driving wheel 110, a driven wheel 120, a main transmission rope 130, and a plurality of tracking units 140, wherein the main transmission rope 130 is connected end to end, so as to form a closed ring shape, one end of the main transmission rope 130 is sleeved on the driving wheel 110, and the other end thereof is sleeved on the driven wheel 120, and the driving wheel 110 can drive the driven wheel 120 to rotate through the main transmission rope 130. The plurality of tracking units 140 are provided at intervals along a length direction of the main transmission rope 130, wherein the length direction of the main transmission rope 130 is just the direction where a connecting line of the driving wheel 110 and the driven wheel 120 is located, each photovoltaic assembly array 200 is mounted on at least one tracking unit 140, the tracking unit 140 is connected to the main transmission rope 130, and the tracking units 140 rotate under the driving of the main transmission rope 130, so as to drive the photovoltaic assembly arrays 200 to rotate, to realize the function of tracking the sun motion.

In use, mounting brackets 141 of the plurality of tracking units 140, the driving wheel 110, and the driven wheel 120 of the rope transmission structure 100 are fixed on the ground (other seats or bases etc. are also feasible), and the main transmission rope 130 is sleeved between the driving wheel 110 and the driven wheel 120, and is in a tensioned state; a driving device is connected on the driving wheel 110, the driving device drives the driving wheel 110 to rotate, the driving wheel 110 drives the main transmission rope 130 to rotate around the driving wheel 110 and the driven wheel 120, the main transmission rope 130 synchronously pulls a first branch rope 143 to be displaced synchronously therewith, the first branch rope 143 correspondingly pulls a rotating member 142 to rotate about a hinge between the rotating member 142 and the mounting bracket 141, the rotating member 142 correspondingly drives the photovoltaic assembly array 200 to rotate, so that the photovoltaic assembly array 200 is always directed toward the sun, thus improving the absorption efficiency of the solar energy; and the main transmission rope synchronously transmits multiple first branch ropes, thereby achieving synchronous driving to a plurality of photovoltaic assembly arrays. In the above, by changing the driving device's driving to a rotation direction of the driving wheel 110, a displacement direction of the main transmission rope 130 can be changed, the rotation directions of the rotating member 142 and the photovoltaic assembly array 200 are correspondingly changed by the first branch rope 143, and an angular rotation range of the photovoltaic assembly array 200 is enlarged, so that it can be always directed to the sun and absorb the solar energy with higher efficiency. Specifically, the driving device may select a motor.

In the above solar energy tracker, firstly, a single first branch rope 143 correspondingly drives one rotating member 142 to rotate, and each photovoltaic assembly array 200 is supported by a small number of tracking units. Taking one photovoltaic assembly array 200 and the tracking units 140 supporting the same as one sub-unit, the whole solar energy tracker may be divided into a plurality of sub-units. During installation, normal rotation of the photovoltaic assembly array 200 in a sub-unit may be realized just by ensuring that the hinges of the tracking units 140 in the single sub-unit are coaxially arranged, while relative positions between the hinges of the tracking units of different sub-units do not need to be limited. Specifically, when each photovoltaic assembly array 200 is mounted to one tracking unit 140, one tracking unit 140 correspondingly supports one photovoltaic assembly array, and when fixing the mounting brackets 141, relative positions and heights etc. between different mounting brackets 141 do not need to be limited, but only the first branch rope 143 needs to be in a tensioned state by adjusting the connection position between the first branch rope 143 and the main transmission rope 130; for another example, when each photovoltaic assembly array is mounted to two tracking units, the two tracking units 140 support the photovoltaic assembly array 200 at different parts, in this case, it is necessary to ensure that the hinges of the two tracking units are coaxially arranged, so as to realize synchronous driving of the two tracking units to the photovoltaic assembly array, thereby improving the support stability to the photovoltaic assembly array, and ensuring the rotation stability of the photovoltaic assembly array.

In the existing solar energy trackers, however, a plurality of vertical posts are generally synchronously driven by a rigid shaft, a plurality of photovoltaic assemblies form a relatively long photovoltaic assembly array through an array, the photovoltaic assembly array is fixed on a plurality of vertical posts along the length direction thereof, that is, one rigid shaft drives one photovoltaic assembly array to rotate by driving a plurality of vertical posts to rotate synchronously, a plurality of vertical posts corresponding to one rigid shaft and one relatively long photovoltaic assembly array are one sub-unit (for example, one rigid shaft synchronously rotates ten vertical posts, and one relatively long photovoltaic assembly array is fixed on the ten vertical posts, then in the prior art, one rigid shaft, one photovoltaic assembly array, and ten vertical posts are one sub-unit; but in the present disclosure, five photovoltaic assembly arrays are provided in a single rope transmission structure (with the same scale, it may be assumed that continuously arranged length of five photovoltaic assembly arrays of the present disclosure is approximately equal to the length of one photovoltaic assembly array in the prior art), each photovoltaic assembly array is supported by two mounting brackets, then one photovoltaic assembly array and two corresponding mounting brackets thereof are one sub-unit), a large number of vertical posts in one sub-unit need to be coaxially arranged so as to realize synchronous driving of the rigid shaft to the vertical posts, but the mounting ground surface has different topographies, then the mounting is difficult, and the coaxiality of the vertical posts is hard to be ensured. Compared with the prior art, when the system scales are the same, the present disclosure further reduces the sub-unit, and a relatively small number of or even no mounting brackets need to be coaxially provided, thereby reducing the mounting position accuracy of the mounting brackets in the mounting, correspondingly reducing the construction cost, and improving the mounting convenience.

It should be noted that the term "photovoltaic assembly array" in the text refers to a panel body formed by arranging a plurality of photovoltaic assemblies in the form of an array with a relatively large area and capable of absorbing solar energy, and specifically, a suitable number of photovoltaic assemblies may be selected to be arrayed according to practical needs, for example, 15~20 photovoltaic assemblies may be selected to be arrayed to obtain one photovoltaic assembly array.

Secondly, the main transmission rope 130 of the present disclosure drives the rotational movement of the rotating member through the first branch rope 143, and there is no direct connection between the mounting bracket and the main transmission rope. As the first branch rope 143 is a flexible member capable of deformation, a horizontal distance or a height difference etc. between the hinge between the rotating member 142 and the mounting bracket 141 and the main transmission rope 130 may be compensated by the first branch rope, that is, the mounting height, position etc. of the mounting bracket on the ground surface do not affect normal use thereof, therefore, a plurality of tracking units of the same model may be selected for use, and the mounting bracket thereof may be directly fixed on the ground surface according to the topography. However, in the existing solar energy trackers, a plurality of vertical posts are usually driven by one rigid shaft to synchronously rotate, and the mounting brackets of different lengths need to be selected for the vertical posts according to various topographies, so as to ensure that when the vertical posts are fixed on the ground surface, the hinge of the vertical posts are consistent with the rigid shaft in height and are connected together, thereby realizing synchronous driving of the rigid shaft to the plurality of vertical posts. Compared with the prior art, the rope transmission structure of the present disclosure may use the tracking units of the same model, which can implement mass production of the tracking units, thereby reducing the manufacturing cost of the rope transmission structure; in addition, in mounting, the installation personnel may directly fix the tracking units without identifying the length of the mounting bracket, thus reducing the mounting difficulty, further improving the mounting convenience of the rope transmission structure, and reducing the mounting cost.

Thirdly, in the existing solar energy trackers, a plurality of rigid shafts are continuously provided, a bending angle between adjacent rigid shafts is large due to the influence of uneven topographies, and correspondingly, the photovoltaic assembly arrays at end portions of adjacent rigid shafts are connected in a separating manner. When cleaning the photovoltaic assembly arrays, a cleaning robot can only continuously clean the photovoltaic assembly arrays on a single rigid shaft, and when the cleaning robot cleans the end portion of the rigid shaft, the cleaning robot cannot continuously reach the next photovoltaic assembly array, then the cleaning robot needs to be carried manually or by a dedicated carrying device to the next photovoltaic assembly array. When the solar energy tracker of the present disclosure includes a plurality of rope transmission structures, the tracking units of the plurality of rope transmission structures are provided according to the topographies, the photovoltaic assembly arrays supported by the plurality of tracking units are also continuously arranged in correspondence with the continuity of the ground surface, then when the photovoltaic assembly arrays need to be cleaned, the cleaning robot can continuously clean the entire row of photovoltaic assembly arrays from one end, without interruption to carry the robot in the middle, thereby improving the cleaning convenience of the solar energy tracker, and reducing the cleaning cost.

Optionally, there may be a plurality of rope transmission structures, and the plurality of rope transmission structures extend along a length direction of one main transmission rope therein, and the photovoltaic assembly arrays mounted on two adjacent rope transmission structures are continuously provided. Each rope transmission structure is corresponding to one driving device, and in use, a plurality of driving devices drive corresponding driving wheels to rotate, respectively, so as to realize synchronous rotation of all photovoltaic assembly arrays. Specifically, the driving wheel and the driven wheel of each rope transmission structure may be correspondingly mounted on one fixing pile, and the distance between two fixing piles adjacent to each other in the adjacent rope transmission structures may be 1.5 times the diameter of the driving wheel or the driven wheel; or one fixing pile may be provided at the position where the adjacent rope transmission structures are connected, the driven wheel of the previous rope transmission structure and the driving wheel of the next rope transmission structure share one fixing pile, and they are vertically provided on the fixing pile.

In addition to the above forms, optionally, as shown in FIG. 5, there may be a plurality of rope transmission structures in the solar energy tracker, the plurality of rope transmission structures extend along the length direction of one main transmission structure therein, and in the two adjacent rope transmission structures, the driven wheel of the rope transmission structure at a transmission front end is used as the driving wheel of the rope transmission structure at a transmission rear end. A plurality of rope transmission structures are continuously provided in a belt shape according to the topographies and perform multi-stage transmission, and along the transmission direction, a plurality of rope transmission mechanisms are a first stage, a second stage, a third stage, etc. respectively; in the above, a wheel body at the transmission front end of a first-stage rope transmission mechanism, as a driving wheel, is connected to the driving device, and along the transmission direction, a subsequent wheel body simultaneously serves as a driven wheel of the previous-stage rope transmission structure and a driving wheel of a next-stage rope transmission structure, that is, the driving wheel rotates under the driving of the driving device, the driving wheel drives the first-stage driven wheel to rotate through the first-stage main transmission rope, the first-stage driven wheel, while rotating, simultaneously serves as a second-stage driving wheel to drive the second-stage main transmission rope to achieve transmission, thus transmitting backwards, and realizing synchronous driving of one driving device to a plurality of rope transmission structures, which not only improves the driving synchronization of a plurality of rope transmission structures to the photovoltaic assembly arrays, but also simplifies the structure of the solar energy tracker; in addition, the number of photovoltaic assembly arrays that can be synchronously driven in the above solar energy tracker is relatively large, and correspondingly, the conversion amount of the solar energy is relatively large.

As shown in FIG. 5, the solar energy tracker includes two rope transmission structures, each rope transmission structure includes four tracking units, each two tracking units are fixed and made into one photovoltaic assembly array, then there are four photovoltaic assembly arrays in the solar energy tracker arranged continuously under the transmission of the rope transmission structure and rotating synchronously.

Optionally, in the present embodiment, the main transmission rope 130 may be fixedly connected to the driving wheel 110. When the driving device drives the driving wheel 110 to rotate, the driving wheel 110 can drive the main transmission rope 130 to move synchronously therewith, thereby ensuring the driving of the driving wheel 110 to the main transmission rope 130, reducing occurrence of the situation that the main transmission rope cannot effectively drive the rotating member and the photovoltaic assembly arrays due to slipping between the main transmission rope 130 and the driving wheel, and correspondingly ensuring the stable operation of the solar energy tracker. Specifically, one end of the main transmission rope 130 may pass through the inside of the driving wheel 110, and is fixed with a rope buckle or a U-shaped screw, so as to prevent displacement of the main transmission rope 130 relative to the driving wheel 110, in this way, the displacement amount of the main transmission rope 130 is limited, the driving wheel 110 can drive the main transmission rope 130 to reciprocate within the range of displacement amount, thus driving the tracking unit 140 to rotate around the sun or revolve to reset. The user controls the driving wheel 110 to rotate through a driving motor, and the driving wheel 110 drives the main transmission rope 130 to move, thereby driving the driven wheel 120 to rotate.

Optionally, the rotating member 142 may include an arc-shaped strip 144 and a mounting strip 145, the arc-shaped strip 144 is provided with a first end portion 146 and a second end portion 147 opposite to each other, the first end portion 146 and the second end portion 147 are both fixedly connected to the mounting strip 145, the arc-shaped strip 144 and the mounting strip 145 are combined to form an arc shape; the mounting strip 145 is hinged to the mounting bracket 141, and the first branch rope 143 is fitted to a side of the arc-shaped strip 144 facing away from the mounting strip 145, and one end of the first branch rope 143 is connected to the first end portion 146. Here is a specific form of the tracking unit. The photovoltaic assembly array 200 is mounted on the mounting strip 145, the mounting strip 145 is hinged to the mounting bracket 141, and the mounting strip 145 can rotate relative to the mounting bracket 141. Specifically, a hinge point between the mounting strip 145 and the mounting bracket 141 is located at a central position of the first end portion 146 and the second end portion 147. The first branch rope 143 is fitted a side of the arc-shaped strip 144 away from the mounting strip 145, and is connected to the first end portion 146, the first branch rope 143 can pull the first end portion 146 to rotate downwards under the action of the main transmission rope 130, so that the rotating member 142 rotates relative to the mounting bracket 141.

In the present embodiment, the main transmission rope 130 is provided along an east-west direction, that is, a direction where a connecting line of the driving wheel 110 and the driven wheel 120 is located is the east-west direction, and the driving wheel 110 can drive the main transmission rope 130 to move in the east-west direction. The main transmission rope 130 is provided at a bottom portion of the arc-shaped strip 144, and the main transmission rope 130 is located on a plane where the rotation direction of the rotating member 142 is located, so that the rotating member 142 can rotate in the east-west direction of a vertical plane, thereby driving the photovoltaic assembly array 200 to track the sun motion.

Figure 3:
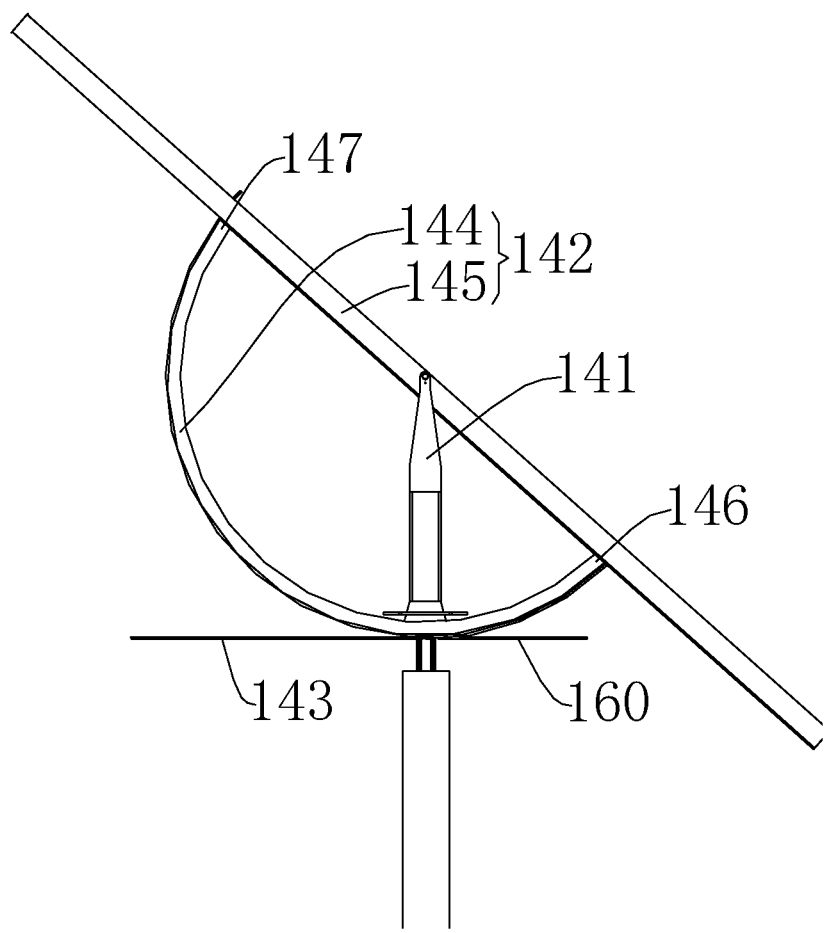
FIG. 3 is a structural schematic view of a tracking unit in the rope transmission structure provided in the present disclosure.

Referring to FIG. 3, the tracking unit 140 includes the mounting bracket 141, the rotating member 142, the first branch rope 143, and a second branch rope 160, wherein the second branch rope 160 is fitted to a side of the arc-shaped strip facing away from the mounting strip, and the second branch rope 160 is provided intersected with the first branch rope 143, the second branch rope 160 has one end connected to the main transmission rope 130, and the other end connected to the second end portion 147; the main transmission rope 130 includes two half rings, wherein one half ring is located on one side of the connecting line between the driving wheel 110 and the driven wheel 120, the other half ring is located on the other side of the connecting line between the driving wheel 110 and the driven wheel 120, a connecting part between the first branch rope 143 and the main transmission rope 130, and a connecting part between the second branch rope 160 and the main transmission rope 130 are located on the same half ring, and this half ring is coplanar with the plane where the rotation direction of the rotating member is located. The rotating member 142 is hinged on the mounting bracket 141, the rotating member 142 can rotate relative to the mounting bracket 141, each photovoltaic assembly array 200 is mounted on one, two or more rotating members 142, and the photovoltaic assembly array 200 can rotate with the rotation of the rotating member 142, thereby realizing tracking of the sun motion. The plane where the rotation direction of the rotating member 142 is located is perpendicular to the plane where the rotation direction of the driving wheel 110 is located. In the present embodiment, optionally, the plane where the rotation direction of the rotating member 142 is located may be a vertical plane, the plane where the rotation direction of the driving wheel 110 is located may be a horizontal plane, and the rotating member 142 drives the photovoltaic assembly array 200 to rotate in the vertical plane, so as to track the east-west direction of the sun's rise and fall.

The first branch rope 143 and the second branch rope 160 are both fitted to one side of the arc-shaped strip 144 away from the mounting strip 145 and intersect with each other, and the first branch rope 143 and the second branch rope 160 tension and stretch the two end portions of the arc-shaped strip 144, respectively, and cooperate with each other to drive the arc-shaped strip to rotate around the hinge; the half ring connected to the first branch rope 143 and the second branch rope 160 is set as a driving half ring, and when the driving half ring transmits towards a direction away from the first end portion 146 (close to the second end portion 147), the first branch rope 143 transmits towards a direction away from the first end portion 146 with the driving half ring, and pulls the first end portion 146 of the arc-shaped strip 144 to rotate downwards, and correspondingly pulls the mounting strip 145 and the photovoltaic assembly array 200 thereon to rotate around the hinge; synchronously, the second end portion 147 of the arc-shaped strip 144 rotates upwards, and the driving half ring drives the second branch rope 160 to transmit towards a direction close to the second end portion 147, then in the process of rotation of the arc-shaped strip 144, the length of the first branch rope 143 fitted to the arc-shaped strip 144 gradually decreases, the length of the second branch rope 160 fitted to the arc-shaped strip 144 gradually increases, the parts of the first branch rope and the second branch rope fitted to the arc-shaped strip cover the whole arc-shaped strip all the time, and only change at the intersection. Similarly, when the main transmission rope transmits towards a direction away from the second end portion (close to the first end portion), the second branch rope transmits towards a direction away from the second end portion with the driving half ring, and pulls the second end portion of the arc-shaped strip to rotate downwards, and correspondingly pulls the mounting strip and the photovoltaic assembly array thereon to rotate around the hinge; synchronously, the first end portion of the arc-shaped strip rotates upwards, and the driving half ring drives the first branch rope to transmit towards a direction close to the first end portion, then in the process of rotation of the arc-shaped strip, the length of the second branch rope fitted to the arc-shaped strip gradually decreases, the length of the first branch rope fitted to the arc-shaped strip gradually increases. The first branch rope and the second branch rope jointly drive the two end portions of the arc-shaped strip, so as to realize rotation of the arc-shaped strip towards different directions, and in the rotation process of the arc-shaped strip, the first branch rope and the second branch rope jointly limit the arc-shaped strip, so as to improve the rotational stability of the arc-shaped strip, and further improve the rotational stability of the mounting strip and the photovoltaic assembly array.

The first branch rope 143 has one end connected to the rotating member 142, and the other end connected to the main transmission rope 130, the second branch rope 160 is provided intersected with the first branch rope 143, and the second branch rope 160 has one end connected to the rotating member 142, and the other end connected to the main transmission rope 130. The rotation of the driving wheel 110 can drive the main transmission rope 130 to move, and the main transmission rope 130, when moving, can drive the first branch rope 143 and the second branch rope 160 to move towards each other. When one end of the first branch rope 143 close to the main transmission rope 130 is away from the rotating member 142, one end of the second branch rope 160 close to the main transmission rope 130 is close to the rotating member 142; when one end of the first branch rope 143 close to the main transmission rope 130 is close to the rotating member 142, one end of the second branch rope 160 close to the main transmission rope 130 is away from the rotating member 142, thereby pulling the rotating member 142 to perform reciprocating rotation.

Optionally, the mounting bracket 141 may include a hinge frame body, a fixing arm 152, and a fixing post 151, wherein there are two fixing arms 152, the two fixing arms 152 are both connected between the fixing post 151 and the hinge frame body, and the two fixing arms 152 are provided opposite to each other on two sides of the hinge frame body, the hinge frame body, the fixing post 151, and the two fixing arms 152 form a limiting hole 153, the mounting strip 145 is hinged with the hinge frame body, and the arc-shaped strip 144 passes through the limiting hole 153. Here is a specific form of the mounting bracket 141, in which the fixing post 151 is configured to be fixed on the ground surface, the hinge frame body is configured to hinge the rotating member 142, and the fixing arms 152 are configured to connect the hinge frame body and the fixing post 151, wherein when the rotating member 142 is hinged to the hinge frame body, the arc-shaped strip 144 below the rotating member 142 passes through the limiting hole 153 between the two fixing arms 152, and in the process of rotation of the rotating member around the hinge, the arc-shaped strip passes through the limiting hole, the limiting hole can limit and guide the rotational stroke of the arc-shaped strip, so as to improve the rotational position accuracy of the arc-shaped strip, and correspondingly, the rotational position accuracy of the photovoltaic assembly array is improved, and besides, it further can be ensured that the first branch rope and the second branch rope are fitted to the arc-shaped strip.

Optionally, the hinge frame body may include a connecting arm 154 and two hinge arms 155, wherein the two hinge arms 155 are both fixedly connected to the connecting arm 154 and provided at the two sides of the connecting arm 154 opposite to each other; and the mounting strip is provided between the two hinge arms 155, and is hinged with the two hinge arms 155 by a hinge member 156. Here is a specific form of the hinge frame body. Specifically, the two hinge arms 155 and the two fixing arms 152 are vertically provided in one-to-one correspondence, then in the process of rotation of the rotating member, the two hinge arms 155 define the position of the mounting strip 145, and at the same time, the two fixing arms define the position of the arc-shaped strip 144, thereby further improving the rotational position accuracy and stability of the rotating member.

Figure 4:
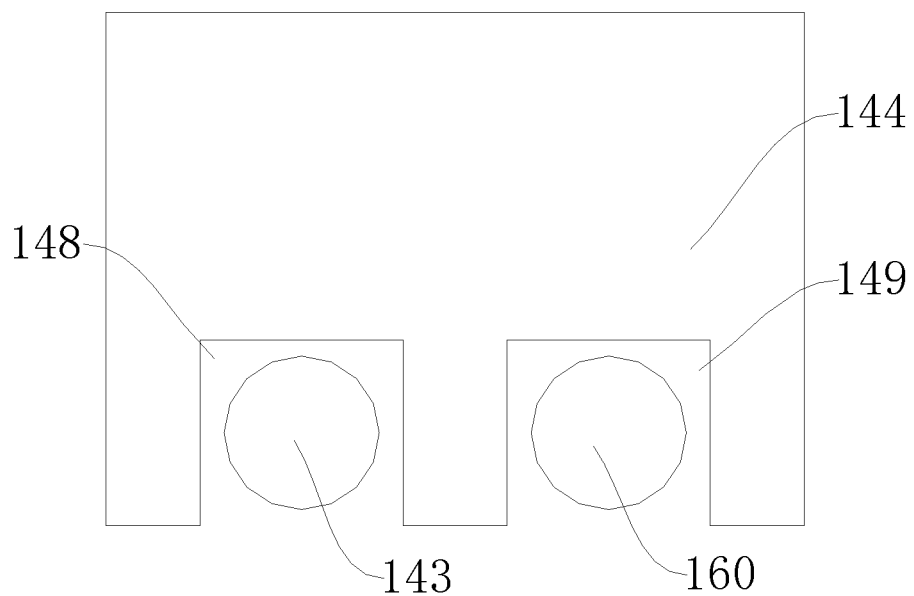
FIG. 4 is a cross-sectional structural schematic view of cooperation between a first branch rope and a second branch rope and a first limiting groove and a second limiting groove on an arc-shaped strip in FIG. 3.

Referring to FIG. 4, in the present embodiment, a first limiting groove 148 and a second limiting groove 149 may be provided on the arc-shaped strip 144, the first branch rope 143 may be embedded in the first limiting groove 148, and the second branch rope 160 may be embedded in the second limiting groove 149, so as to improve the fastness and position accuracy of the fitting of the first branch rope 143 and the second branch rope 160 with the arc-shaped strip 144. In addition, the first limiting groove 148 and the second limiting groove 149 define the fitting positions of the first branch rope 143 and the second branch rope 160 and the arc-shaped strip, respectively, so as to reduce the frictional force of contact between the first branch rope 143 and the second branch rope 160, thus improving the rotation smoothness of the arc-shaped strip.

When the sun rotates from east to west, the driving device (a motor may be selected) drives the driving wheel 110 to rotate, the driving wheel 110 drives the main transmission rope 130 to move, and the main transmission rope 130 pulls the first end portion 146 to rotate downwards through the first branch rope 143. In this case, the second end portion 147 rotates upwards, and one end of the first branch rope 143 close to the main transmission rope 130 is away from the rotating member 142, and one end of the second branch rope 160 close to the main transmission rope 130 is close to the rotating member 142, thus, the photovoltaic assembly array 200 rotates from east to west with the sun; after sunset, the driving device (a motor may be selected) drives the driving wheel 110 to rotate back, the driving wheel 110 drives the main transmission rope 130 to reset, and the main transmission rope 130 pulls the second end portion 147 to rotate downwards through the second branch rope 160, at this time, the first end portion 146 rotates upwards, and one end of the first branch rope 143 close to the main transmission rope 130 is close to the rotating member 142, and one end of the second branch rope 160 close to the main transmission rope 130 is away from the rotating member 142, so that the photovoltaic assembly array 200 returns to an initial position, and waits for next tracking.

For the rope transmission structure 100 provided in the present disclosure, the main transmission rope 130 is connected end to end, one end of the main transmission rope 130 is sleeved outside the driving wheel 110, the other end is sleeved outside the driven wheel 120, the driving wheel 110 can drive the driven wheel 120 to rotate through the main transmission rope 130, and the plurality of tracking units 140 are provided at intervals along the length direction of the main transmission rope 130. The tracking unit 140 includes the mounting bracket 141, the rotating member 142, and the first branch rope 143. The rotating member 142 is hinged on the mounting bracket 141, a plane where the rotation direction of the rotating member 142 is located is perpendicular to a plane where the rotation direction of the driving wheel 110 is located. The first branch rope 143 has one end connected to the rotating member 142, and the other end connected to the main transmission rope 130, and the first branch rope 143 can drive the rotating member 142 to rotate when the driving wheel 110 rotates. Compared with the prior art, as the rope transmission structure 100 provided in the present disclosure adopts the main transmission rope 130 sleeved outside the driving wheel 110 and the driven wheel 120 and the first branch rope 143 connected between the main transmission rope 130 and the rotating member 142, the length from the driving wheel 110 to the driven wheel 120 is ultra-long, then a plurality of rotating members 142 can be simultaneously driven to rotate, the construction cost and the cleaning cost are reduced, and the practicability is strong, so that the solar energy tracker 10 is economic and practical, with high cost performance.

Figure 6:
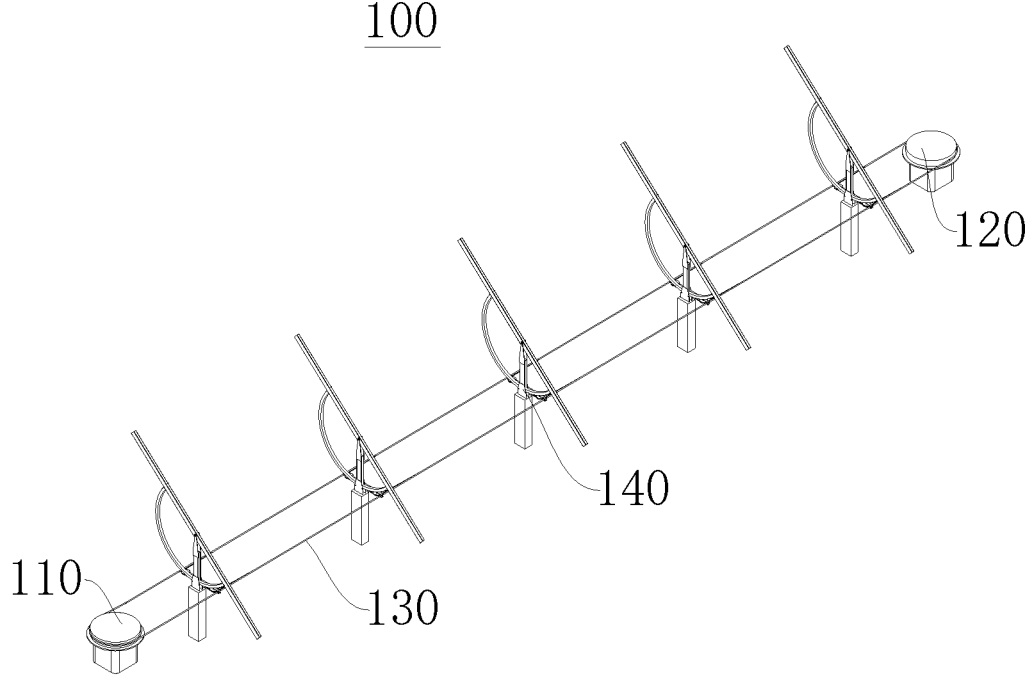
FIG. 6 is a structural schematic view of a rope transmission structure in FIG. 5.

Apart from the above form of providing the solar energy tracker in the east-west direction, referring to FIG. 6 and FIG. 9, an embodiment of the present disclosure provides a solar energy tracker 10, the tracking unit 140 further includes a first fixed pulley 170, a second fixed pulley 180, and a third branch rope 190, but the second branch rope 160 is no longer included, and the length direction of the main transmission rope is perpendicular to the plane where the rotation direction of the rotating member is located, the first branch rope winds the first fixed pulley and is connected to the main transmission rope, and the first fixed pulley 170 changes an extending direction of the first branch rope 143; a third branch rope is fitted to a side of the arc-shaped strip facing away from the mounting strip, and provided intersected with the first branch rope, one end of the third branch rope is connected to the second end portion, and the other end winds the second fixed pulley and is connected to the main transmission rope, and the second fixed pulley 180 changes an extending direction of the third branch rope 190.

In the present embodiment, the first fixed pulley 170 and the second fixed pulley 180 are both mounted on the mounting bracket 141, and the first fixed pulley 170 and the second fixed pulley 180 are provided opposite to each other in a closed area enclosed by the main transmission rope 130. The first branch rope 143 is connected to the main transmission rope 130 through the first fixed pulley 170, the first branch rope 143 can drive the first fixed pulley 170 to rotate when moving, the third branch rope 190 is connected to the main transmission rope 130 through the second fixed pulley 180, and the third branch rope 190 can drive the second fixed pulley 180 to rotate when moving.

In the present embodiment, the main transmission rope 130 is provided along a south-north direction, that is, a direction where a connecting line of the driving wheel 110 and the driven wheel 120 is located is the south-north direction, and the driving wheel 110 can drive the main transmission rope 130 to move along the south-north direction. The length direction of the main transmission rope 130 is perpendicular to the plane where the rotation direction of the rotating member 142 is located, the first branch rope 143 is connected to a half ring of the main transmission rope 130 away from the first end portion, changes the direction thereof after bypassing the first fixed pulley 170, and then is fitted to one side of the arc-shaped strip 144 facing away from the mounting strip 145, and is connected to the first end portion 146, and the first branch rope 143 can pull the first end portion 146 to move downwards under the action of the main transmission rope 130, so that the rotating member 142 rotates relative to the mounting bracket 141.

The third branch rope 190 is connected to the other half ring of the main transmission rope 130, changes the direction thereof after bypassing the second fixed pulley 180 and then is fitted to one side of the arc-shaped strip 144 facing away from the mounting strip 145, and is connected to the second end portion 147. The third branch rope 190 and the first branch rope 143 are intersected with each other. When moving, the third branch rope 190 can drive the second fixed pulley 180 to rotate, the third branch rope 190 can pull the second end portion 147 to move downwards under the action of the main transmission rope 130, so that the rotating member 142 rotates back relative to the mounting bracket 141.

Figure 7:
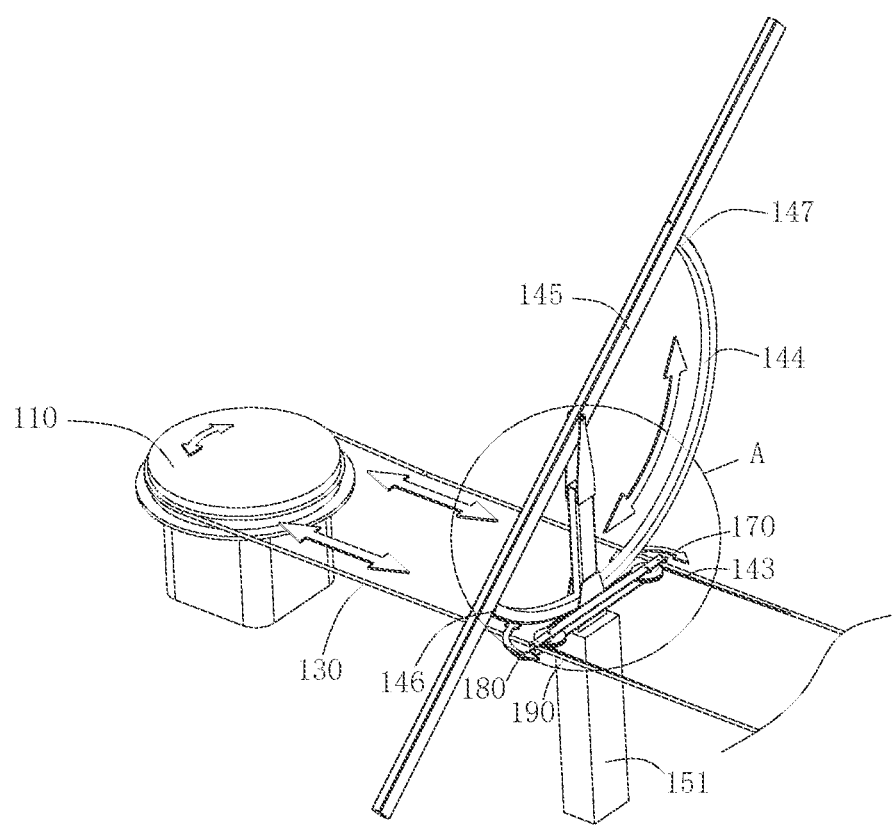
FIG. 7 is a schematic view of part of components of the rope transmission structure in FIG. 6.
Figure 8:
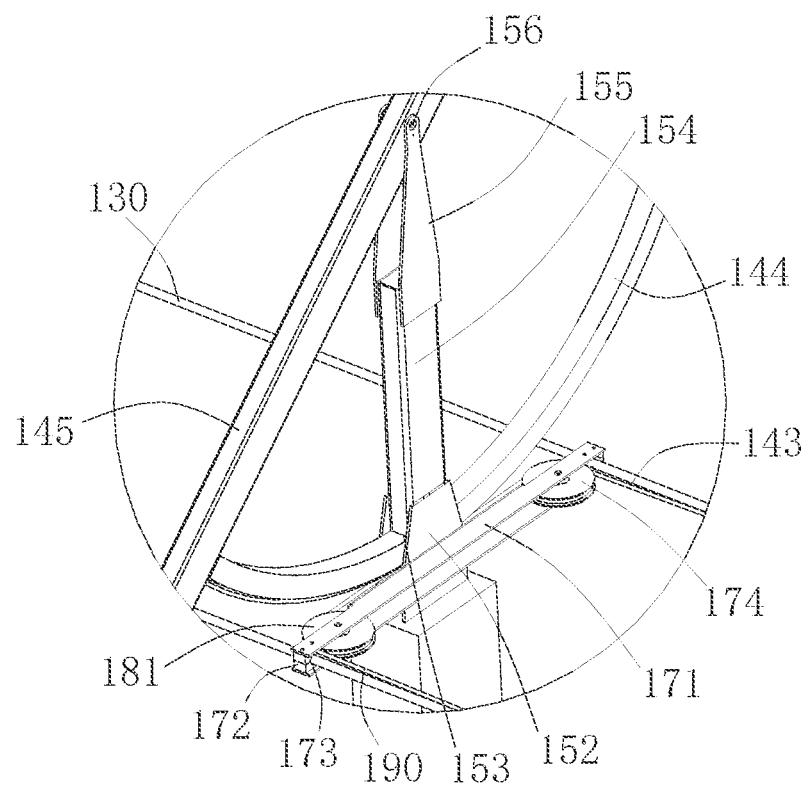
FIG. 8 is a local enlarged schematic view of part A in FIG. 7.

Specifically, referring to what is shown in FIG. 7 and FIG. 8, connecting parts of the first branch rope 143 and the third branch rope 190 and the two half rings are located on the same side of the mounting bracket 141 (both are located on the right side of the mounting bracket 141 in FIG. 7), the driving wheel 110 rotates under the driving of the driving device. As shown in FIG. 7, the driving wheel drives the third branch rope 190 to transmit towards a direction away from the mounting bracket 141, and the third branch rope winds a second pulley to drive the second end portion of the arc-shaped strip to rotate downwards; meanwhile, the first branch rope transmits towards the mounting bracket under the stretching action of upward rotation of the first end portion. In the above, the transmission directions of the driving wheel, the main transmission rope, a first pulley, the second pulley, and the rotating member, as shown in FIG. 7, may be reciprocally transmitted according to different rotation directions of the driving wheel.

Specifically, as shown in FIG. 7 and FIG. 8, a fixing frame 171 may be mounted on the mounting bracket, the length direction of the fixing frame 171 is perpendicular to the length direction of the main transmission rope 130, and one end of the fixing frame 171 away from the first end portion is pivotally connected to the first pulley 174 to form the first fixed pulley 170; and one end of the fixing frame 171 facing away from the second end portion is pivotally connected to a second pulley 181 to form the second fixed pulley 180. Here is a specific form of the first fixed pulley and the second fixed pulley. First, the first pulley 174 and the second pulley 181 are both pivotally connected to the fixing frame 171 so as to form the first fixed pulley and the second fixed pulley. In mounting, the fixing frame may be mounted just once, then the mounting is highly convenient, and the relative positional accuracy between the first fixed pulley and the second fixed pulley is high; secondly, the length direction of the fixing frame is perpendicular to the length direction of the main transmission rope, the matching degree of the first pulley and the second pulley with the half rings on the corresponding sides is higher, the branch rope bypassing the pulley and the half ring of the corresponding side are provided approximately collinear, thus the half ring drives the branch rope to transmit with higher synchronism, and correspondingly, transmission synchronism of the first branch rope and the second branch rope to the rotating member is higher, and the rotation stability of the rotating member is also higher.

Optionally, a guide block 172 further may be provided at two ends of the fixing frame, each guide block 172 is provided with a guide hole 173, and the main transmission rope is slidably penetrated through the guide hole 173. When the main transmission rope transmits under the driving of the driving wheel, the two half rings of the main transmission rope correspondingly pass through the guide hole on the same side and transmit in the guide hole, respectively, the guide hole connects the end portion of the fixing frame with the main transmission rope, so as to improve the stability of the relative position of the fixing frame and the main transmission rope, further ensuring the relative position between the first pulley and the second pulley and the main transmission rope, and ensuring collinearity between the branch rope bypassing the pulley and the main transmission rope.

It should be noted that the first fixed pulley 170 and the second fixed pulley 180 are both provided in the closed area formed by the main transmission rope 130, the plane where the rotation direction of the first fixed pulley 170 is located, the plane where the rotation direction of the second fixed pulley 180 is located, and the plane where the rotation direction of the driving wheel 110 is located are all the same plane, so as to reduce the frictional resistance of the first fixed pulley 170 and the first branch rope 143, and further, the frictional resistance of the second fixed pulley 180 and the third branch rope 190 can be reduced.

Referring to FIG. 10, in the present embodiment, a first limiting groove 148 and a second limiting groove 149 may be provided on the arc-shaped strip 144, a portion of the first branch rope 143 fitted to the arc-shaped strip is embedded in the first limiting groove 148, and a portion of the third branch rope 190 fitted to the arc-shaped strip is embedded in the second limiting groove 149, so as to reduce the friction between the first branch rope 143 and the third branch rope 190. Specifically, the first limiting groove and the second limiting groove may both extend along the length direction of the arc-shaped strip, and the first limiting groove and the second limiting groove are provided at intervals.

When the sun rotates from east to west, the driving device drives the driving wheel 110 to rotate, the driving wheel drives the main transmission rope 130 to move, and the main transmission rope 130 pulls the first end portion 146 to rotate downwards through the first branch rope 143. In this case, the second end portion 147 rotates upwards, and one end of the first branch rope 143 close to the main transmission rope 130 is away from the rotating member 142, and one end of the third branch rope 160 close to the main transmission rope 130 is close to the rotating member 142, thus, the photovoltaic assembly array 200 rotates from east to west with the sun; after sunset, the driving device drives the driving wheel 110 to rotate back, the driving wheel drives the main transmission rope 130 to reset, and the main transmission rope 130 pulls the second end portion 147 to rotate downwards through the third branch rope 190, at this time, the first end portion 146 rotates upwards, and one end of the first branch rope 143 close to the main transmission rope 130 is close to the rotating member 142, and one end of the third branch rope 190 close to the main transmission rope 130 is away from the rotating member 142, so that the photovoltaic assembly array 200 returns to an initial position, and waits for next tracking.

The above-mentioned are merely for preferred embodiments of the present disclosure and not used to limit the present disclosure. For one skilled in the art, various modifications and changes may be made to the present disclosure. Any modifications, equivalent substitutions, improvements and so on, within the spirit and principle of the present disclosure, should be covered within the scope of protection of the present disclosure.

INDUSTRIAL APPLICABILITY

For the rope transmission structure, the solar energy tracker, and the application method thereof provided in the present embodiment, a plurality of mounting brackets of the rope transmission structure can be provided continuously according to the topographies, the mounting of the mounting bracket is highly convenient with low mounting accuracy requirement, so as to effectively reduce the construction cost of the solar energy tracker.

What is claimed is:

1. A rope transmission structure, comprising a driving wheel, a driven wheel, a main transmission rope, and a plurality of tracking units, wherein the main transmission rope is connected end to end, one end of the main transmission rope is sleeved on the driving wheel, and the other end thereof is sleeved on the driven wheel, the driving wheel is capable of driving the driven wheel to rotate through the main transmission rope, the plurality of tracking units are provided at intervals along a length direction of the main transmission rope, wherein each of the tracking units comprises a mounting bracket, a rotating member, and a first branch rope, wherein the rotating member is hinged on the mounting bracket, a plane where a rotation direction of the rotating member is located is perpendicular to a plane where a rotation direction of the driving wheel is located, the first branch rope has one end connected to the rotating member, and the other end connected to the main transmission rope, and the first branch rope is capable of driving the rotating member to rotate when the driving wheel rotates.

2. The rope transmission structure according to claim 1, wherein the rotating member comprises an arc-shaped strip and a mounting strip, wherein the arc-shaped strip is provided with a first end portion and a second end portion that are opposite to each other, wherein the first end portion and the second end portion are both fixedly connected to the mounting strip, the mounting strip is hinged to the mounting bracket, and the first branch rope is fitted to a side of the arc-shaped strip facing away from the mounting strip, and one end of the first branch rope is connected to the first end portion.

3. The rope transmission structure according to claim 2, wherein the main transmission rope is provided at a bottom portion of the arc-shaped strip, and the main transmission rope is located on the plane where the rotation direction of the rotating member is located.

4. The rope transmission structure according to claim 3, wherein the mounting bracket comprises a hinge frame body, fixing arms, and a fixing post, wherein two fixing arms are provided, the two fixing arms are both connected between the fixing post and the hinge frame body, and the two fixing arms are provided opposite to each other on two sides of the hinge frame body, the hinge frame body, fixing post, and the two fixing arms form a limiting hole, the mounting strip is hinged with the hinge frame body, and the arc-shaped strip passes through the limiting hole.

5. The rope transmission structure according to claim 3, wherein each of the tracking units further comprises a second branch rope, wherein the second branch rope is fitted to a side of the arc-shaped strip facing away from the mounting strip, and the second branch rope is provided intersected with the first branch rope, the second branch rope has one end connected to the main transmission rope, and the other end connected to the second end portion; the main transmission rope comprises two half rings, wherein one half ring is located on one side of a connecting line between the driving wheel and the driven wheel, the other half ring is located on the other side of the connecting line between the driving wheel and the driven wheel; and a connecting part between the first branch rope and the main transmission rope, and a connecting part between the second branch rope and the main transmission rope are located on the same half ring, and this half ring is coplanar with the plane where the rotation direction of the rotating member is located.

6. A method for using the rope transmission structure according to claim 5, wherein operation steps of the method comprise:
fixing the driving wheel, the driven wheel, and the mounting bracket, wherein parts of the first branch rope and the second branch rope fitted to the arc-shaped strip jointly cover the whole arc-shaped strip; and
controlling the driving wheel to rotate, wherein the driving wheel drives the main transmission rope to achieve transmission, when the driving wheel is in a first driving direction, the main transmission rope pulls the first branch rope to rotate synchronously therewith, the first branch rope pulls the arc-shaped strip to rotate around a hinge between the mounting strip and the mounting bracket, wherein a length of the first branch rope fitted to the arc-shaped strip decreases, and meanwhile, a length of the second branch rope fitted to the arc-shaped strip increases; or
when the driving wheel is in a second driving direction, the main transmission rope pulls the second branch rope to rotate synchronously therewith, the second branch rope pulls the arc-shaped strip to rotate around a hinge between the mounting strip and the mounting bracket, wherein the length of the second branch rope fitted to the arc-shaped strip decreases, and meanwhile, the length of the first branch rope fitted to the arc-shaped strip increases.

7. The rope transmission structure according to claim 5, wherein the mounting bracket comprises a hinge frame body, fixing arms, and a fixing post, wherein two fixing arms are provided, the two fixing arms are both connected between the fixing post and the hinge frame body, and the two fixing arms are provided opposite to each other on two sides of the hinge frame body, the hinge frame body, the fixing post, and the two fixing arms form a limiting hole, the mounting strip is hinged with the hinge frame body, and the arc-shaped strip passes through the limiting hole.

8. The rope transmission structure according to claim 2, wherein the mounting bracket comprises a hinge frame body, fixing arms, and a fixing post, wherein two fixing arms are provided, the two fixing arms are both connected between the fixing post and the hinge frame body, and the two fixing arms are provided opposite to each other on two sides of the hinge frame body, the hinge frame body, the fixing post, and the two fixing arms form a limiting hole, the mounting strip is hinged with the hinge frame body, and the arc-shaped strip passes through the limiting hole.

9. The rope transmission structure according to claim 8, wherein the hinge frame body comprises a connecting arm and two hinge arms, wherein the two hinge arms are both fixedly connected to the connecting arm and provided at two sides of the connecting arm opposite to each other; and the mounting strip is provided between the two hinge arms, and is hinged with the two hinge arms by a hinge member.

10. The rope transmission structure according to claim 2, wherein each of the tracking units further comprises a first fixed pulley, wherein the first fixed pulley is mounted on the mounting bracket, a length direction of the main transmission rope is perpendicular to the plane where the rotation direction of the rotating member is located, and the first branch rope winds the first fixed pulley and is connected to the main transmission rope.

11. The rope transmission structure according to claim 10, wherein each of the tracking units further comprises a second fixed pulley and a third branch rope, wherein the second fixed pulley is mounted to the mounting bracket, and is provided opposite to the first fixed pulley, the third branch rope is fitted to a side of the arc-shaped strip facing away from the mounting strip, and provided intersected with the first branch rope, one end of the third branch rope is connected to the second end portion, and the other end winds the second fixed pulley and is connected to the main transmission rope.

12. The rope transmission structure according to claim 11, wherein a fixing frame is mounted on the mounting bracket, a length direction of the fixing frame is perpendicular to the length direction of the main transmission rope, and one end of the fixing frame facing away from the first end portion is pivotally connected to the first pulley, so as to form the first fixed pulley;
and one end of the fixing frame facing away from the second end portion is pivotally connected to a second pulley, so as to form the second fixed pulley.

13. The rope transmission structure according to claim 12, wherein guide blocks are provided at two ends of the fixing frame, each of the guide blocks is provided with a guide hole, and the main transmission rope is slidably penetrated through the guide hole.

14. The rope transmission structure according to claim 11, wherein a first limiting groove and a second limiting groove is provided on the arc-shaped strip, a portion of the first branch rope fitted to the arc-shaped strip is embedded in the first limiting groove, and a portion of the third branch rope fitted to the arc-shaped strip is embedded in the second limiting groove.

15. The rope transmission structure according to claim 14, wherein the first limiting groove and the second limiting groove both extend along a length direction of the arc-shaped strip, and the first limiting groove and the second limiting groove are provided at intervals.

16. The rope transmission structure according to claim 11, wherein the first fixed pulley and the second fixed pulley are both provided in a closed area formed by the main transmission rope, and a plane where a rotation direction of the first fixed pulley is located, a plane where a rotation direction of the second fixed pulley is located, and a plane where a rotation direction of the driving wheel is located are all the same plane.

17. The rope transmission structure according to claim 1, wherein the main transmission rope is fixedly connected to the driving wheel.

18. A solar energy tracker, comprising a rope transmission structure and a plurality of photovoltaic assembly arrays, wherein the rope transmission structure comprises a driving wheel, a driven wheel, a main transmission rope, and a plurality of tracking units, wherein the main transmission rope is connected end to end, one end of the main transmission rope is sleeved on the driving wheel, and the other end thereof is sleeved on the driven wheel, the driving wheel is capable of driving the driven wheel to rotate through the main transmission rope, the plurality of tracking units are provided at intervals along a length direction of the main transmission rope, wherein each of the tracking units comprises a mounting bracket, a rotating member, and a first branch rope, each of the photovoltaic assembly arrays is mounted on at least one rotating member, the rotating member is hinged on the mounting bracket, a plane where a rotation direction of the rotating member is located is perpendicular to a plane where a rotation direction of the driving wheel is located, the first branch rope has one end connected to the rotating member, and the other end connected to the main transmission rope, and the first branch rope is capable of driving the rotating member to rotate when the driving wheel rotates.

19. The solar energy tracker according to claim 18, wherein each of the photovoltaic assembly arrays is mounted on two rotating members.

20. The solar energy tracker according to claim 18, wherein a plurality of rope transmission structures are provided, the plurality of rope transmission structures extend along a length direction of one main transmission rope therein, and the photovoltaic assembly arrays mounted on two adjacent rope transmission structures are continuously provided.

\* \* \* \* \*